United States Patent [19]

Bleakley et al.

[11] Patent Number: 5,342,600

[45] Date of Patent: Aug. 30, 1994

[54] PRECIPTATED CALCIUM CARBONATE

[75] Inventors: Ian S. Bleakley; Thomas R. Jones, both of St. Austell, United Kingdom

[73] Assignee: ECC International Limited, United Kingdom

[21] Appl. No.: 974,955

[22] Filed: Nov. 13, 1992

Related U.S. Application Data

[63] Continuation-in-part of Ser. No. 767,039, Sep. 26, 1991, abandoned.

[30] Foreign Application Priority Data

Sep. 27, 1990 [GB] United Kingdom ............. 9021072.5

[51] Int. Cl.$^5$ ............................................. C01F 11/18
[52] U.S. Cl. ..................................... 423/432; 423/430; 423/160; 423/165; 106/464
[58] Field of Search ............... 423/430, 432, 160, 165; 106/464; 252/313.1

[56] References Cited

U.S. PATENT DOCUMENTS

| | | | |
|---|---|---|---|
| 2,081,112 | 5/1937 | Statham et al. | 423/432 |
| 2,964,382 | 12/1960 | Hall, Jr. | 423/431 |
| 3,126,253 | 3/1964 | Podschus | 423/432 |
| 3,268,387 | 8/1966 | Casciani et al. | 423/432 |
| 3,320,026 | 5/1967 | Waldeck | 423/432 |
| 3,920,800 | 11/1975 | Harris | 423/432 |
| 4,018,877 | 4/1977 | Woode | 423/432 |
| 4,157,379 | 6/1979 | Arika et al. | 423/432 |
| 4,367,207 | 1/1983 | Vanderheiden | 423/432 |
| 4,714,603 | 12/1987 | Vanderheiden | 423/432 |
| 5,075,093 | 12/1991 | Tanaka | 423/432 |
| 5,164,172 | 11/1992 | Katayama et al. | 423/430 |

FOREIGN PATENT DOCUMENTS

| | | | |
|---|---|---|---|
| 53-73498 | 6/1978 | Japan | 423/432 |
| 56-160322 | 12/1981 | Japan | 423/432 |
| 59-26927 | 2/1984 | Japan | 423/432 |

*Primary Examiner*—Michael Lewis
*Assistant Examiner*—N. M. Nguyen
*Attorney, Agent, or Firm*—Klauber & Jackson

[57] ABSTRACT

A method of preparing precipitated calcium carbonate which comprises slaking quicklime in an aqueous medium, passing the suspension of calcium hydroxide through a sieve having an aperture size in the range of 40 to 70 microns, carbonating the calcium hydroxide and separating the calcium carbonate from the aqueous medium in which it is suspended. The sieved calcium hydroxide is subjected to high energy, high shear agitation which is terminated prior to carbonation. During the carbonation, the suspension of calcium hydroxide is subjected to relatively lower energy and shear agitation compared to the previous high energy, high shear agitation.

16 Claims, No Drawings

PRECIPITATED CALCIUM CARBONATE

This application is a continuation-in-part of U.S. Ser. No. 07/767,039 filed on Sep. 26, 1991, now abandoned.

BACKGROUND OF INVENTION

The present invention concerns calcium carbonate suitable for use especially as a filler in papermaking or as a pigment in a paper coating composition, and a process for the preparation thereof.

Since about 1920, chemically precipitated calcium carbonate has been used as a pigment or filler in the paper industry. Various chemical routes have been followed to precipitate the calcium carbonate, but the most frequently used methods are based on the double decomposition of sodium carbonate with either calcium hydroxide or calcium chloride, or on the carbonation with carbon dioxide gas of an aqueous suspension of calcium hydroxide ("milk of lime"). The double decomposition processes generally make use of by-products or other chemical processes and therefore tend to yield calcium carbonate products which contain unwanted salts. The process based on the carbonation of milk of lime is performed in three stages; firstly, the calcination of raw limestone to produce calcium oxide or "quicklime"; secondly, the "slaking" of the quicklime with water to produce an aqueous suspension of calcium hydroxide; and finally, the carbonation of the calcium hydroxide with a gas comprising carbon dioxide.

In order to prepare a precipitated calcium carbonate for the paper industry a process based upon the carbonation of milk of lime is preferred because there is no serious problem of contamination of the product with unwanted salts, and each of the three stages in the production process can be controlled to adjust the properties of the final product.

Calcium carbonate can be precipitated from aqueous solution in three different crystal forms: the vaterite form which is thermodynamically unstable, the calcite form which is the most stable and the most abundant in nature, and the aragonite form which is metastable under normal ambient conditions of temperature and pressure, but converts to calcite at elevated temperature. The aragonite form crystallises as long, thin needles having a length:diameter ratio of about 10:1, but the calcite form exists in several different shapes of which the most commonly found are the rhombohedral shape in which the length and the diameter of the crystals are approximately equal, and the crystals may be aggregated or unaggregated; and the scalenohedral shape in which the crystals are like double, two-pointed pyramids having a length:width ratio of about 4:1, and which are generally aggregated. All these forms of calcium carbonate can be prepared by carbonation of milk of lime by suitable variation of the process conditions.

A particularly desirable type of pigment for the paper industry has come to be known as a "bulking pigment". The opacity and brightness of a paper sheet filled or coated with a mineral material depend on the ability of the sheet to scatter light. If the pigment consists of fine particles which are separated by small spaces or voids, the scattering effect is generally enhanced, and is found to be at an optimum when the width of the spaces or voids is about half the wavelength of visible light, or about 0.25 microns. Bulking pigments, or pigments consisting of fine particles separated by spaces or voids of about the optimum size are desirable in the paper industry on account of their ability to scatter visible light, but if the pigment consists of discrete fine particles, the retention of these particles in a matrix of cellulosic papermaking fibres is poor. To obtain good retention, the fine particles must be aggregated together to form clusters of larger size.

High light scattering pigments currently available to the paper industry include titanium dioxide, which is very effective but also expensive, and fine kaolin particles which have been aggregated either thermally or by chemical means. The pigments derived from kaolin are also effective in scattering light, but are again expensive. Of the forms of calcium carbonate, the aragonite form is effective as a high light scattering pigment but the process conditions necessary for its production are stringent and difficult to control. The rhombohedral form has crystals which are generally unaggregated and which pack together too closely and do not leave between them voids or spaces of the appropriate size. The scalenohedral form may be produced relatively inexpensively and the process conditions may be readily controlled to give aggregates of fine crystals separated by spaces of substantially the optimum size for light scattering, and is therefore the preferred form of calcium carbonate for use as a bulking pigment in the paper industry.

It is an object of this invention to provide a calcium carbonate bulking pigment for the paper industry which is at least as effective in light scattering as an aggregated kaolin pigment but less expensive.

PRIOR ART

U.S. Pat. No. 2,081,112 (N. Statham & T. G. Leek) describes a process for producing precipitated calcium carbonate by carbonating milk of lime. It is recognised that the more violent the agitation in the gas absorber, the finer will be the product, and the aim is to create a fine mist of calcium hydroxide slurry in the presence of the carbon dioxide-containing gas. The temperature in the gas absorber is maintained at 50-60 degrees Celsius, preferably around 55° C.

U.S. Pat. No. 2,964,382 (G. E. Hall, Jr) concerns the production of precipitated calcium carbonate by various chemical routes in which calcium ions are contacted with carbonate ions in a precipitation zone, including the carbonation of milk of lime. High shear, intense turbulence is provided in the precipitation zone by means of an impeller rotating at a peripheral speed of at least 1160 feet per minute (589 cm. per sec).

U.S. Pat. No. 3,320,026 (W. F. Waldeck) describes the production of different forms of calcium carbonate including the scalenohedral form. The calcium hydroxide is relatively coarse and contains at least 50% by weight of particles larger than 10 microns. The temperature in the gas absorber is maintained at less than 20° C.

U.S. Pat. No. 4,018,877 (R. D. A. Woods) describes a carbonation process in which there is added to the suspension in the gas absorber, after the calcium carbonate primary nucleation stage and before completion of the carbonation step, a complexing agent for calcium ions, such as ethylenediamine tetraacetic acid (EDTA), aminotriacetic acid, aminodiacetic acid or a hydroxy polycarboxylic acid.

U.S. Pat. No. 4,157,379 (J. Arika et al) describes the production of a chain-structured precipitated calcium carbonate by the carbonation of calcium hydroxide suspended in water in the presence of a chelating agent and a water soluble metal salt.

U.S. Pat. No. 4,367,207 (D. B. Vanderheiden) describes a process in which carbon dioxide containing gas is introduced into an aqueous calcium hydroxide slurry containing an anionic organopolyphosphonate electrolyte to give a finely divided precipitated calcium carbonate.

STATEMENT OF INVENTION

A precipitated calcium carbonate having improved light scattering properties is prepared by a process comprising the following steps:
(a) slaking quicklime in an aqueous medium;
(b) optionally subjecting said medium to substantially continuous agitation during said slaking;
(c) passing the suspension of calcium hydroxide through a sieve having an aperture size in the range from 40 to 70 microns;
(d) subjecting the suspension which passes through the sieve to high energy, high shear agitation, so as to convert the calcium hydroxide into a finely dispersed condition;
(e) terminating said high energy, high shear agitation on achieving a suspension of finely divided slaked lime;
(f) carbonating said suspension of finely dispersed slaked lime by passing therethrough sufficient of a gas comprising carbon dioxide to cause the pH of the suspension to fall to substantially neutral;
(g) during said carbonation of step (f), subjecting said suspension to substantially continuous agitation of relatively lower energy and shear compared with the high energy, high shear agitation of step (d); and
(h) separating the precipitated calcium carbonate formed in step (g) from the aqueous medium in which it is suspended.

In order to produce calcium carbonate in the scalenohedral form, the quicklime is preferably added to sufficient of the aqueous medium to give, on completion of step (b), a suspension having a calcium hydroxide concentration of from 5–30 grams of calcium hydroxide per 100 ml of aqueous medium, i.e. 5–30% w/v (weight to volume in gm/100 ml aqueous medium). The temperature of the aqueous medium is preferably maintained in the range from 30° to 50° C. The slaking is conveniently carried out for 15 to 30 minutes.

The high energy, high shear agitation of step (d) is of sufficiently high intensity to convert the calcium hydroxide into a finely dispersed condition as described above. Such high energy, high shear agitation is advantageous as it promotes the provision of a calcium hydroxide high reaction surface area for the carbonation of step (f).

The high energy, high shear agitation may be provided by first agitation means involving any of the following techniques:- high speed turbine impeller means, ultrasonic techniques, and agitation of the suspension with a particulate grinding medium comprising hard particles of diameter from about 0.25 mm to about 2 mm.

It is preferred that the high speed turbine impeller means as first agitation means has a peripheral agitation speed in the range of 40 to 70 meters per second.

On achieving the desired end result of the high shear agitation i.e. the provision of finely dispersed calcium hydroxide, the high shear, high energy agitation is terminated prior to initiation of the carbonation of step (f).

In step (f), in order to produce calcium carbonate in the scalenohedral form, the suspension of finely dispersed staked lime is preferably diluted, if necessary, to a concentration of not more than 15% w/v and maintained at a temperature in the range from 40° to 65° C.

The carbonating gas preferably contains from 5% to 50% by volume of carbon dioxide, the remainder being conveniently air or nitrogen. The carbon dioxide-containing gas is preferably admitted into the suspension of finely dispersed slaked lime in the form of fine bubbles. This may be achieved, for example, by admitting the gas under pressure through a perforated plate gas sparger. The rate of admission of the carbon dioxide-containing gas is preferably in the range from 0.02 to 0.10 moles of carbon dioxide per minute per mole of calcium hydroxide.

The substantially continuous agitation of relatively lower energy and lower shear of step (g) is typically achieved by second agitation means preferably having a peripheral speed in the range of 200 to 700 centimeters per second. Suitable second agitation means include propeller, impeller and turbine means rotating so as to achieve a peripheral speed in the above mentioned 200 to 700 centimeters per second range. An optimum peripheral speed of the second agitations means is in the range of about 400 to about 600 centimeters per second.

The main aim of the relatively lower energy, lower shear agitation of step (g) is to maintain the suspension of calcium hydroxide in a substantially disturbed condition and hence promote contact between the calcium hydroxide and carbon dioxide reactant media.

The continuous agitation carried out during step (b) is preferably analogous to the lower energy, lower shear agitation of step (g).

The pH of the suspension is preferably monitored throughout the carbonation step so that the admission of the carbon dioxide-containing gas may be stopped when the pH has fallen to substantially neutral.

There is further provided by the present invention a process of preparing precipitated calcium carbonate comprising the following steps:
(a) slaking quicklime in an aqueous medium;
(b) optionally subjecting said medium to substantially continous agitation during said slaking;
(c) passing the suspension of calcium hydroxide through a sieve having an aperture size in the range from 40 to 70 microns;
(d) subjecting the suspension which passes through the sieve to high energy, high shear agitation, so as to convert the calcium hydroxide into a finely dispersed condition;
(e) terminating said high energy, high shear agitation on achieving a suspension of finely divided slaked lime;
(f) carbonating said suspension of finely dispersed slaked lime by passing therethrough sufficient of a gas comprising carbon dioxide to cause the pH of the suspension to fall to substantially neutral;
(g) during said carbonation of step (f), subjecting said suspension to substantially continous agitation by means of propeller, turbine or impeller means having a peripheral speed in the range of 200 to 700 cm per second; and
(h) separating the precipitated calcium carbonate formed in step (g) from the aqueous medium in which it is suspended.

In step (h) the precipitated calcium carbonate is preferably separated from the aqueous medium in which it is suspended by filtration. The filter cake may then be thermally dried and milled in order to provide a substantially dry, powdered product, or, alternatively, the filter cake may be redispersed by means of a dispersing agent for the calcium carbonate in order to provide a concentrated aqueous suspension suitable for use, for example, in a paper coating composition.

The present invention will now be described in more detail, with reference to the following illustrative Examples.

EXAMPLE 1

Samples of quicklime prepared by calcining a French limestone, were added to sufficient water at a temperature of 40° C. to give, at the completion of step (a) respectively, slurries having calcium hydroxide concentrations of 7.4% w/v, 14.8% w/v and 29.6% w/v. In each case the mixture was stirred vigorously for 25 minutes and was then poured through a No. 300 mesh British Standard Sieve (nominal aperture 53 microns) in order to remove any undispersed residue such as unslaked quicklime.

Samples of each of the three slurries which had been passed through the sieve were subjected to high shear, high intensity mixing in a Waring Blendor and at one minute intervals the viscosity of the slurry measured using a Brookfield Viscometer at a spindle speed of 100 rpm. For each slurry a graph was drawn of apparent viscosity against time. It was found that for the 1M slurry the viscosity reached a maximum after 15 minutes and then began to decrease; in the case of the 2M slurry the viscosity reached a maximum after 10 minutes; but in the case of the 4M slurry the viscosity was still rising after 30 minutes.

The Waring Blendor is a high speed stirring device equipped with an impeller of diameter 47.6 mm rotating at a speed of 22,500 rpm, thus giving a peripheral speed of 56 m per second.

150 ml portions of each of the 7.4% w/v and 14.8% w/v 29.6% w/v suspensions of slaked lime which had passed through the sieve were then subjected to high shear mixing in the Waring Blendor for 15 minutes, 10 minutes and 20 minutes, respectively. The high shear mixing was terminated and the 14.8% and 29.6% w/v suspensions were diluted to 7.4% w/v, and 150 ml portions of each suspension were transferred to a carbonation vessel.

The carbonation vessel was surrounded by a water jacket, the temperature of the water flowing through which was thermostatically controlled to maintain a temperature of 45° C. in the vessel. Carbon dioxide-containing gas was admitted into the vessel under pressure through a perforated plate gas sparger mounted at the bottom of the vessel. Immediately above the sparger was mounted a variable-speed impeller of diameter 30 mm.

The carbon dioxide-containing gas consisted of a mixture of 25% by volume of carbon dioxide and 75% by volume of compressed air and was admitted at a rate of 0.04 moles of carbon dioxide per minute per mole of calcium hydroxide. The stirrer was rotated at a speed of 2,000 rpm (peripheral speed 313 cm per second) throughout the carbonation step, and the pH of the suspension was continuously monitored. When the pH of the suspension had fallen to 7 the carbonation was considered to be complete and the flow of the carbon dioxide-containing gas stopped.

In each case the precipitated calcium carbonate was separated from the aqueous medium by filtration and the Kubelka-Munk scattering coefficient S was then measured by the technique described in Example 1 of our U.K. Patent Specification 2246344.

As a comparison, the experiment was repeated as described above except that the step of high shear mixing in the Waring Blendor was omitted.

The results are set forth in Table 1 below:

TABLE 1

| Reaction Parameters | Scattering coefficient ($m^2 \cdot kg^{-1}$) |
|---|---|
| No high shear mixing | 244 |
| High shear mixing - 7.4% w/v Ca(OH)$_2$ | 307 |
| High shear mixing - 7.4% w/v Ca(OH)$_2$ | 291 |
| High shear mixing - 29.6% w/v Ca(OH)$_2$ | 301 |

These results show that precipitated calcium carbonates having significantly higher scattering coefficients are obtained when the calcium hydroxide is subjected to high shear mixing before carbonation is commenced. The differences in the scattering coefficient for the precipitated calcium carbonates obtained from slaked lime suspensions subjected to high shear mixing at different concentrations are considered to be within the limits of experimental accuracy.

EXAMPLE 2

Samples of quicklime prepared by calcining the same limestone as was used in Example 1 were added to sufficient water at a temperature of 40° C. to give, at the completion of step (a), respectively, slurries having calcium hydroxide concentrations of 14.8% w/v and 29.6% w/v. In each case the mixture was stirred vigorously for 25 minutes and was then passed through a No. 300 mesh British Standard Sieve in order to remove any undispersed residue.

150 ml portions of each of the 14.8% and 29.6% w/v suspensions of slaked lime which had passed through the sieve were then subjected to high shear mixing in the Waring Blendor for 10 minutes and 20 minutes, respectively. The high shear mixing was terminated and the 14.8% and 29.6% w/v suspensions were diluted to 7.4% w/v, and 150 ml portions of each suspension were transferred to the carbonation vessel.

Each suspension was carbonated as described in Example 1, except that in each case the stirrer was rotated at a speed of 500 rpm (peripheral speed 79 cm per second).

In each case the precipitated calcium carbonate was separated from the aqueous medium by filtration and the Kubelka-Munk scattering coefficient S was measured.

As a comparison the experiment was repeated as described above except that the step of high shear mixing in the Waring Blendor was omitted. The results are set forth in Table II below.

TABLE II

| Reaction Parameters | Scattering coefficient ($m^2 \cdot kg^{-1}$) |
|---|---|
| No high shear mixing | 195 |
| High shear mixing - 14.8% w/v Ca(OH)$_2$ | 248 |
| High shear mixing - 29.6% w/v Ca(OH)$_2$ | 228 |

When these results are compared with those obtained in Example 1 it can be seen that agitation during carbonation of the order of 79 cm per second was not sufficient intensity to promote contact between the finely dispersed calcium hydroxide and carbon dioxide, and hence yield the desired calcium carbonate product.

Continuous agitation during carbonation having a peripheral speed in the range of 200 to 700 cm per second is required for the production of calcium carbonate by a method according to the present invention.

EXAMPLE 3

A sample of quicklime prepared by calcining the same limestone as was used in Example 1 was added to sufficient water at a temperature of 40° C. to give at the completion of step (a), a suspension having a calcium hydroxide concentration of 14.8% w/v. The mixture was stirred vigorously for 25 minutes and was then poured through a No. 300 mesh British Standard sieve in order to remove any undispersed residue. An ultrasonic probe was inserted into the suspension which had passed through the sieve and samples were withdrawn and the apparent viscosity of each sample was measured by means of a Brookfield Viscometer at a spindle speed of 100 rmp. The high shear agitation was then terminated.

Each sample was then diluted with water to a calcium hydroxide concentration of (7.4% w/v) and carbon dioxide gas was passed through the diluted suspension under the conditions described in Example 1 above. The precipitated calcium carbonate was separated from the aqueous medium by filtration and the Kubelka-Munk scattering coefficient S was measured. The results are set forth in Table III below.

TABLE III

| Duration of Ultrasonic Treatment (Mins) | Apparent Viscosity (mPa · s) | Scattering Coefficient ($m^2Kg^{-1}$) |
| --- | --- | --- |
| 0 | 300 | 211 |
| 5 | 940 | 233 |
| 10 | 1510 | 280 |
| 15 | 1700 | 273 |
| 30 | 2500 | 261 |

These results show that the scattering coefficient of the precipitated calcium carbonate appears to reach a maximum after 10 minutes of ultrasonic treatment, even though the apparent viscosity of the suspension continues to rise after this time.

EXAMPLE 4

Samples of quicklime prepared by calcining the same limestone as was used in Example 1 were added to sufficient water at a temperature of 40° C. to give, at the completion of step (a), suspensions having calcium hydroxide concentrations of, respectively, 7.4% w/v, 14.8% w/v and 29.6% w/v. In each case the mixture was stirred vigorously for 25 minutes and was then poured through a No. 300 mesh British Standard sieve in order to remove any undispersed residue.

Portions of all three of the suspensions which had passed through the sieve were subjected to high energy, high shear agitation in an attrition grinding mill which was provided with an impeller rotating on a central, vertical shaft and which was charged with a grinding medium consisting of Leighton Buzzard silica sand of granule size in the range from 0.05 mm to 1.0 mm. Portions of the suspensions having calcium hydroxide concentrations of 7.4% w/v and 29.6% w/v were subjected to agitation for time sufficient to dissipate in the suspensions 200 kwh and 800 khw of energy, respectively, per tonne of dry calcium hydroxide (720 KJ per kg and 2880 KJ per kg). The suspension having a calcium hydroxide concentration of 14.8% w/v was subjected to agitation only for a time sufficient to dissipate in the suspension 200 kwh of energy per tonne of dry calcium hydroxide.

At the completion of the attrition grinding treatment the samples of calcium hydroxide suspension were separated from the sand by pouring through a No. 60 mesh British Standard sieve (nominal aperture 0.25 mm).

Following termination of the attrition grinding and the separation described above the samples of the suspension having calcium hydroxide concentrations of 14.8% w/v and 29.6% w/v, respectively, were then each diluted with water to a calcium hydroxide concentration of 7.4% w/v and all of the suspensions were then carbonated with carbon dioxide gas under the conditions described in Example 1 above.

In each case the precipitated calcium carbonate was separated from the aqueous medium by filtration and the Kubelka-Munk scattering coefficient S was measured. The results are set forth in Table IV below.

TABLE IV

| Calcium Concentration | Energy Dissipated (kW · hr per tonne) | Scattering ($m^2 \cdot kg^{-1}$) |
| --- | --- | --- |
| 1M | 200 | 294 |
| 1M | 800 | 300 |
| 2M | 200 | 299 |
| 4M | 200 | 317 |
| 4M | 800 | 331 |

EXAMPLE 5

A sample of quicklime prepared by calcining the same limestone as was used in Example 1 was added to sufficient water at a temperature of 40° C. to give, at the completion of step (a), a suspension having a calcium hydroxide concentration of 7.4 w/v. The mixture was stirred vigorously for 25 minutes and was then poured through a No. 300 mesh British Standard sieve in order to remove any undispersed residue. Approximately half of the suspension which had passed through the sieve was divided into four 150 ml portions each of which was subjected to high shear mixing in the Waring Blendor for 15 minutes with the impeller rotating at a peripheral speed of 56 m per second. The other half of the suspension which had passed through the sieve was not subjected to high shear mixing but was also divided into four 150 ml portions.

All eight portions of suspension were carbonated in the same way as described in Example 1, except that four different speeds of rotation of the stirrer were used, namely 500 rpm, 2,000 rpm, 3,000 rpm and 4,000 rpm, which correspond to 79, 313, 471 and 628 cm per second, respectively. At each stirrer rotation speed there were carbonated one portion of suspension which had been subjected to high shear mixing prior to carbonation, and one portion of suspension which had not been so treated.

In each case the precipitated calcium carbonate was separated from the aqueous medium by filtration, and the Kubelka-Munk scattering coefficient, S, was measured. The results are set forth in Table V below:

TABLE V

| | Scattering coefficient ($m^2 \cdot kg^{-1}$) | |
| --- | --- | --- |
| Stirrer Peripheral Speed (cm · $sec^{-1}$) | With High Shear Mixing | Without High Shear Mixing |
| 79 | 248 | 195 |

TABLE V-continued

| Stirrer Peripheral Speed (cm · sec$^{-1}$) | Scattering coefficient (m$^2$ · kg$^{-1}$) | |
|---|---|---|
| | With High Shear Mixing | Without High Shear Mixing |
| 313 | 307 | 244 |
| 471 | 327 | 254 |
| 628 | 327 | 253 |

The results illustrate that high energy agitation to provide a finely dispersed suspension of calcium hydroxide, followed by low shear mixing using a stirrer of optimum peripheral speed in the region of about 400 to 600 cm per second as shown in the above table, produces calcium carbonate having desirable light scattering properties.

We claim:

1. A process of preparing precipitated calcium carbonate comprising the following steps:
   (a) slaking quicklime in an aqueous medium;
   (b) subjecting said medium to continuous agitation during said slaking;
   (c) passing a suspension of calcium hydroxide obtained in step (b) through a sieve having an aperture size in the range from 40 to 70 microns;
   (d) subjecting the suspension which passes through the sieve to high energy, high shear agitation with an impeller having a peripheral speed of 40–70 m/sec, so as to convert the calcium hydroxide into a finely dispersed condition;
   (e) terminating said high energy, high shear agitation on achieving a suspension of finely dispersed slaked lime;
   (f) carbonating said finely dispersed slaked lime of said suspension by passing therethrough sufficient of a gas comprising carbon dioxide to cause the pH of the suspension to fall to neutral;
   (g) during said carbonation of step (f), subjecting said suspension to continuous agitation to maintain the suspension with an impeller having a peripheral speed of 200–700 cm/sec, said agitation being of relatively lower energy and shear compared with the high energy, high shear agitation of step (d); and
   (h) separating precipitated calcium carbonate formed in step (g) from the aqueous medium in which it is suspended.

2. A process according to claim 1, which produces on completion of step (b), a suspension having a concentration of 5 to 30 grams of calcium hydroxide per 100 ml of aqueous medium.

3. A process according to claim 1, wherein the temperature of said aqueous medium of step (a) is maintained within the range from 30° to 50° C.

4. A process according to claim 1, wherein said suspension is diluted to a concentration of not more than 15 grams of slaked lime per 100 ml of aqueous medium and maintained at a temperature in the range from 40° to 65° C. during step (f).

5. A process according to claim 1, wherein said carbonating gas contains from 5% to 50% by volume of carbon dioxide, the remainder being air or nitrogen.

6. A process according to claim 1, wherein said carbonating gas is admitted into the suspension of finely dispersed slaked lime in the form of fine bubbles.

7. A process according to claim 1, wherein said carbonating gas is admitted into the suspension of finely dispersed slaked lime at a rate in the range from 0.02 to 0.10 moles of carbon dioxide per minute per starting mole of calcium hydroxide.

8. A process according to claim 1, wherein said relatively lower energy, lower shear agitation of step (g) is by an impeller having a peripheral speed of about 600 cm per second.

9. A process of preparing precipitated calcium carbonate comprising the following steps:
   (a) slaking quicklime in an aqueous medium;
   (b) passing a suspension of calcium hydroxide obtained in step (a) through a sieve having an aperture size in the range from 40 to 70 microns;
   (c) subjecting the suspension which passes through the sieve to high energy, high shear agitation with an impeller having a peripheral speed of 40–70 m/sec, so as to convert the calcium hydroxide into a finely dispersed condition;
   (d) terminating said high energy, high shear agitation on achieving a suspension of finely dispersed slaked lime;
   (e) carbonating said finely dispersed slaked lime of said suspension by passing therethrough sufficient of a gas comprising carbon dioxide to cause the pH of the suspension to fall to neutral;
   (f) during said carbonation of step (e), subjecting said suspension to continuous agitation to maintain the suspension with an impeller having a peripheral speed of 200–700 cm/sec, said agitation being of relatively lower energy and shear compared with the high energy, high shear agitation of step (c); and
   (g) separating precipitated calcium carbonate formed in step (f) from the aqueous medium in which it is suspended.

10. A process according to claim 9, which produces on completion of step (a), a suspension having a concentration of from 5 to 30 grams of calcium hydroxide per 100 ml of aqueous medium.

11. A process according to claim 9, wherein the temperature of said aqueous medium of step (a) is maintained within the range from 30° to 50° C.

12. A process according to claim 9, wherein said suspension is diluted to a concentration of not more than 15 grams of slaked lime per 100 ml of aqueous medium and maintained at a temperature in the range from 40° to 65° C. during step (e).

13. A process according to claim 9, wherein said carbonating gas contains from 5% to 50% by volume of carbon dioxide, the remainder being air or nitrogen.

14. A process according to claim 9, wherein said carbonating gas is admitted into the suspension of finely dispersed slaked lime in the form of fine bubbles.

15. A process according to claim 9, wherein said carbonating gas is admitted into the suspension of finely dispersed slaked lime at a rate in the range from 0.02 to 0.10 moles of carbon dioxide per minute per starting mole of calcium hydroxide.

16. A process according to claim 9, wherein said relatively lower energy, lower shear agitation of step (f) is by an impeller having a peripheral speed of about 600 cm per second.

* * * * *